Patented Dec. 27, 1938

2,141,547

UNITED STATES PATENT OFFICE 2,141,547

SOFT GRAINED DEXTROSE FREE FROM WATER OF CRYSTALLIZATION

William B. Newkirk, Western Springs, Ill., assignor, by mesne assignments, to Corn Products Refining Company, New York, N. Y., a corporation of New Jersey No Drawing. Application July 31, 1936, Serial No. 93,573

1 Claim. (Cl. 127—30)

This invention relates to the production of a pulverulent soft dextrose containing substantially no particles having a palpable granular structure for use particularly in compounds containing fatty substances, such, for example, as sweetened chocolate, vegetable butter coverings and the co-called sandwich fillings used by the biscuit trade, all of which products should contain nothing gritty to the teeth.

For these uses it is desirable to employ dextrose containing no water of crystallization. Hydrate dextrose is not suitable because its water of crystallization tends, under certain conditions, to emulsify the fatty substances and to develop rancidity. It has not been found possible, or at least practical, to grind and sift crystalline anhydrous dextrose so as to completely reduce and eliminate granular particles of sufficient size and number so that, when the sugar is used in this state it will not give a gritty feel to the teeth in compounds of the class mentioned above in which smoothness of feel in the mouth is a practical requisite.

The present invention is based upon the discovery that if hydrate dextrose is dehydrated with substantial completeness, for example, by heating, it can be readily pulverized so as to give a soft, impalpable, nongritty powder suitable for use in compounds containing fatty substances and which are intended to be smooth to the taste.

The hydrate crystalline dextrose may be produced in any suitable manner, for example, in accordance with the methods disclosed in United States patent to W. B. Newkirk, No. 1,471,347, October 23, 1923, and No. 1,521,830, January 6, 1925, the product being known commercially as "cerelose" and containing water of crystallization.

This crystalline hydrate dextrose is subjected to sufficient heat to eliminate substantially all of its water of crystallization. For example it may be heated in a Huhn drier at temperatures from 160° to 200° Fahrenheit; this drier consisting of a rotary drum with stationary heating coils therein, the drum lifting the sugar and allowing it to fall through the heating coils. The removal of the water of crystallization might be effected in other ways, for example by different heating apparatus from that mentioned or by drying at low temperatures under a vacuum.

The removal of the water of crystallization leaves the sugar crystals with an enormous number of minute voids so that when the dehydrated material is ground it can be readily pulverized to the desired impalpable powder. The drying takes place, apparently, so rapidly that the molecular structure does not have a chance to change from that characteristic of hydrate dextrose to that which characterizes anhydrous dextrose, so that the product may be properly termed "dehydrated hydrate dextrose" rather than "anhydrous dextrose." Whether there is subsequently some molecular change after the dextrose has been reduced to the pulverulent state is not known. The pulverizing should take place soon enough after the dehydration step so that atmospheric moisture will not bring about any appreciable hydration of the dehydrated sugar.

I claim:

Method of producing a pulverulent dextrose substantially free from water of crystallization and substantially free from particles having a palpable granular structure which consists in heating hydrate dextrose crystals to remove water of crystallization therefrom and then, before the dehydrated sugar absorbs atmospheric moisture to any appreciable extent, grinding the dehydrated hydrate dextrose to an impalpable powder.

WILLIAM B. NEWKIRK.